(12) United States Patent
Kuribayashi et al.

(10) Patent No.: US 7,362,002 B2
(45) Date of Patent: Apr. 22, 2008

(54) AUTOMOTIVE STARTER GENERATOR APPARATUS

(75) Inventors: Masaru Kuribayashi, Tokyo (JP); Yoshihito Asao, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 81 days.

(21) Appl. No.: 10/570,794

(22) PCT Filed: Jun. 17, 2005

(86) PCT No.: PCT/JP2005/011139
§ 371 (c)(1),
(2), (4) Date: Mar. 6, 2006

(87) PCT Pub. No.: WO2006/003799
PCT Pub. Date: Jan. 12, 2006

(65) Prior Publication Data
US 2006/0267344 A1  Nov. 30, 2006

(30) Foreign Application Priority Data
Jul. 6, 2004 (JP) .............................. 2004-199290

(51) Int. Cl.
*H02K 47/00* (2006.01)
(52) U.S. Cl. ...................................................... 290/31
(58) Field of Classification Search ................... 290/31
See application file for complete search history.

(56) References Cited
U.S. PATENT DOCUMENTS 6,977,475 B2 * 12/2005 Kuribayashi et al. ........ 318/140
7,230,399 B2 * 6/2007 Kuribayashi et al. ........ 318/434
2004/0232793 A1 * 11/2004 Fujita et al. ............. 310/156.43
2006/0087181 A1 * 4/2006 Kusumi ..................... 310/68 D
2007/0041843 A1 * 2/2007 Vasilescu et al. ........ 416/244 R

FOREIGN PATENT DOCUMENTS

| DE | 4107867 | A1 | * | 9/1991 |
|---|---|---|---|---|
| JP | 6-46550 | A | | 2/1994 |
| JP | 8-336245 | A | | 12/1996 |
| JP | 10004661 | A | * | 1/1998 |
| JP | 2001-16900 | A | | 1/2001 |
| JP | 2002-191195 | A | | 7/2002 |
| JP | 2002191195 | A | * | 7/2002 |
| JP | 2003-61398 | A | | 2/2003 |
| JP | 2003061398 | A | * | 2/2003 |
| JP | 2003-225000 | A | | 8/2003 |
| JP | 2003225000 | A | * | 8/2003 |
| JP | 2004-187346 | A | | 7/2004 |
| JP | 2004187346 | A | * | 7/2004 |

* cited by examiner

*Primary Examiner*—Joseph Waks
(74) *Attorney, Agent, or Firm*—Sughrue Mion, PLLC (57) ABSTRACT

An automotive staffer generator apparatus that is inexpensive and compact, enabling engine starting functions and generating functions to be made compatible by improving maximum torque without having to increase the number of turns in an armature winding. An automotive starter generator machine includes: an armature core onto which an armature winding is wound; and a rotor having: a claw-pole rotor core disposed on an inner peripheral side of the armature core; and a field winding installed on an inner peripheral side of claw-shaped magnetic poles of the claw-pole rotor core, and has a starting function for starting an engine and a generating function. Permanent magnets are disposed between adjacent claw-shaped magnetic poles.

4 Claims, 7 Drawing Sheets

AUTOMOTIVE STARTER GENERATOR APPARATUS

TECHNICAL FIELD

The present invention relates to an automotive starter generator apparatus that is linked to a vehicle engine and performs engine starting and generating.

BACKGROUND ART

In conventional claw-pole automotive alternators, power generating characteristics have been improved by disposing permanent magnets between claw-shaped magnetic poles (see Patent Literature 1, for example). However, in Patent Literature 1, no description or indication is made concerning using automotive alternators as automotive dynamoelectric machines for performing engine starting and generating.

In conventional techniques for claw-pole dynamoelectric machines having engine starting functions and generating functions, no mention is made of measures for making starting functions and generating functions compatible when permanent magnets are disposed between the claw-shaped magnetic poles.

Patent Literature 1: Japanese Patent No. 2,548,882 (Specifications)

DISCLOSURE OF INVENTION PROBLEM TO BE SOLVED BY THE INVENTION

In automotive starter motors, improvements in output are required in a constant output region in order to achieve kick-over torque during engine starting and to crank engine speed up to high speed. Maximum torque can be increased without increasing the body dimensions of an automotive starter motor by increasing the number of turns in an armature winding. However, if the number of turns in the armature winding is increased, output in the constant output region is reduced due to constraints on input voltage, making it impossible to reach target engine starting speeds.

On the other hand, satisfactory efficiency is required during generating operation in automotive alternators. Increasing the number of turns in the armature winding means increasing resistance in the armature winding, thereby increasing copper loss in the armature winding and reducing generating efficiency.

Thus, for dynamoelectric machines having engine starting and generating functions, also known as automotive starter generator machinery, high-efficiency generating operation becomes impossible if the number of turns in the armature winding is increased, but maximum torque during engine starting operation cannot be increased unless the number of turns in the armature winding is increased, and a solution is sought to these conflicting problems.

If the number of turns in the armature winding is reduced, the generated voltage no longer reaches the system voltage at the desired rotational speed in the generating operational state. In that case, the generated voltage can be induced to reach the system voltage by performing chopper voltage-amplifying control using an inverter, etc., while generating. However, in order to improve power generating volume when power generation is being voltage-amplified by such an inverter, it is necessary to increase a controlling line current, giving rise to increases in inverter size.

In conventional automotive dynamoelectric machines having generating functions, it is necessary to control the generated voltage so as to be constant even though the rotational speed varies, and the electric load on the vehicle also varies. In order to solve this problem, field winding methods are adopted so as to control field current by a voltage regulator.

However, in conventional field winding dynamoelectric machines, due to effects from magnetic saturation and magnetic flux leakage in rotor cores, increases in magnetic flux greater than those at present cannot be expected, and one problem has been that body dimensions must be increased in size in order to increase the maximum torque when functioning as a starter motor, giving rise to increases in costs and deterioration in mountability.

The present invention aims to solve the above problems and an object of the present invention is to provide an automotive starter generator apparatus that is inexpensive and compact enabling engine starting functions and generating functions to be made compatible in an automotive dynamoelectric machine including a claw-pole rotor by disposing permanent magnets between claw-shaped magnetic poles so as to increase magnetic flux and improve maximum torque without having to increase the number of turns in an armature winding.

MEANS FOR SOLVING PROBLEM

In order to achieve the above object, according to one aspect of the present invention, there is provided an automotive starter generator apparatus including: a battery; an automotive dynamoelectric machine linked to an engine, the automotive dynamoelectric machine being driven by electric power from the battery during starting of the engine so as to start the engine, and being driven by the engine after the engine has been started so as to generate alternating-current power; an inverter having a plurality of sets constituted by: a pair of switching elements connected in series between positive and negative terminals of the battery; and a diode connected in parallel with the switching elements, a connection point between the switching elements connected in series being connected to the automotive dynamoelectric machine; and a control apparatus for controlling the inverter such that the switching elements are switched ON and OFF during starting of the engine to supply electric power from the battery to the automotive dynamoelectric machine to drive the automotive dynamoelectric machine, and the switching elements are controlled after the engine has been started such that the diodes rectify alternating-current power generated by the automotive dynamoelectric machine and charge the battery, wherein the automotive dynamoelectric machine includes: an armature core onto which an armature winding is wound; and a rotor having: a claw-pole rotor core disposed on an inner peripheral side of the armature core; and a field winding installed on an inner peripheral side of claw-shaped magnetic poles of the claw-pole rotor core; and a permanent magnet is disposed between an adjacent pair of the claw-shaped magnetic poles.

EFFECTS OF THE INVENTION

According to the present invention, because magnetic flux is added to the rotor by disposing permanent magnets between claw-shaped magnetic poles, maximum torque is improved without increasing the number of turns in the armature winding. Furthermore, because it is not necessary to increase the number of turns in the armature winding to improve the maximum torque, deterioration of characteristics in a constant output region resulting from increasing the number of turns in the armature winding is suppressed and increases in the size of body dimensions of the dynamoelectric machine are also suppressed, enabling size and cost reductions.

BEST MODE FOR CARRYING OUT THE INVENTION

Preferred embodiments of the present invention will now be explained with reference to the drawings.

Embodiment 1

Figure 1:
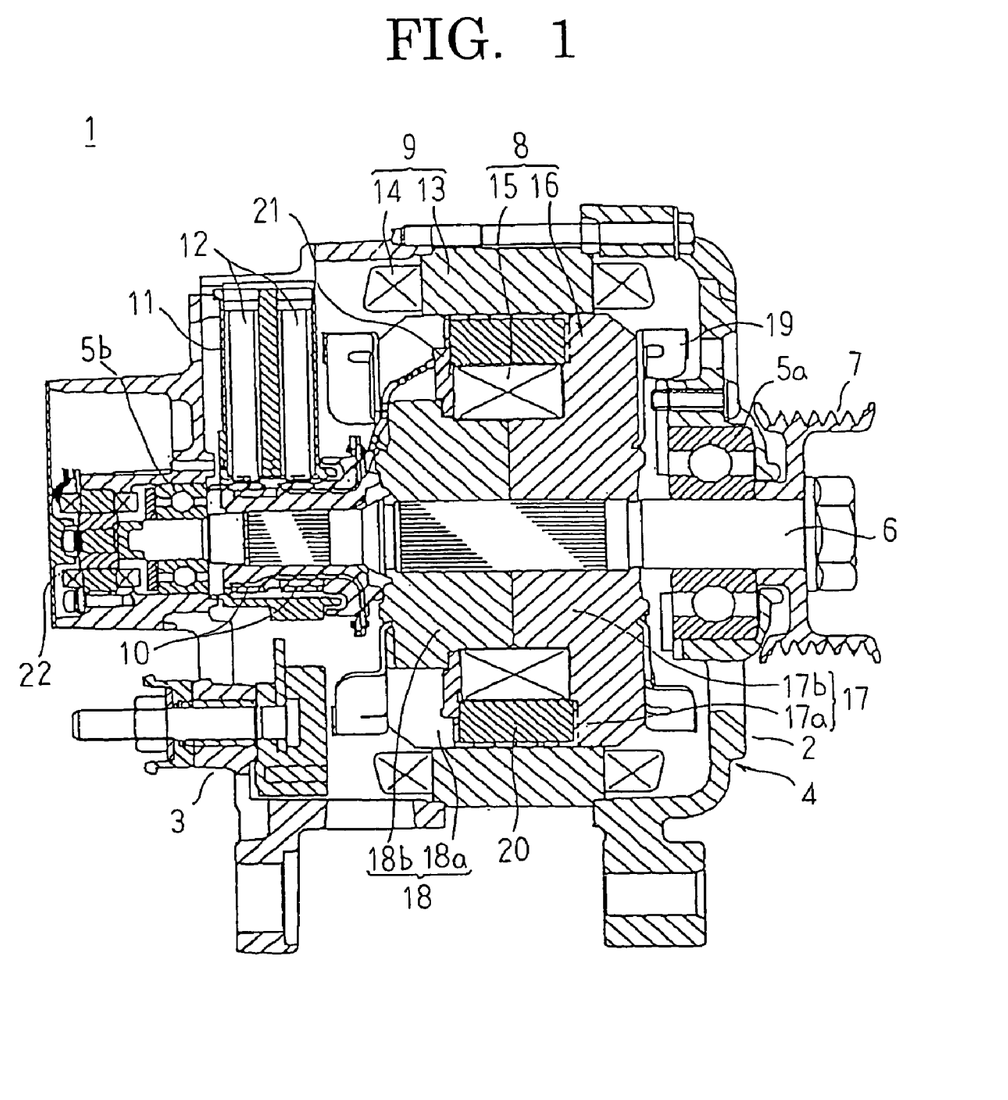
FIG. 1 is a longitudinal section showing an automotive starter generator machine according to Embodiment 1 of the present invention.
Figure 2:
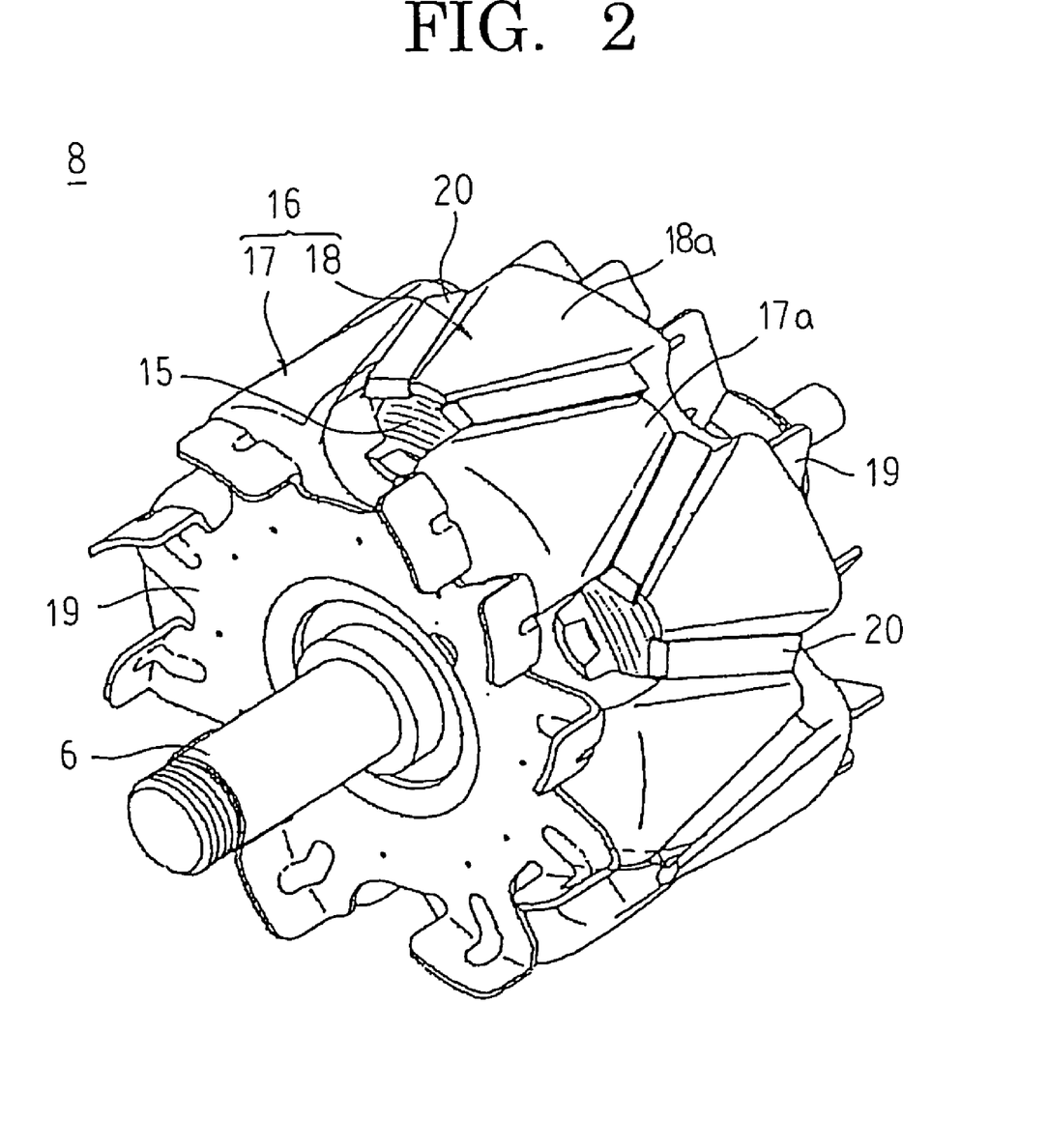
FIG. 2 is a perspective showing a rotor in the automotive starter generator machine according to Embodiment 1 of the present invention.
Figure 3:
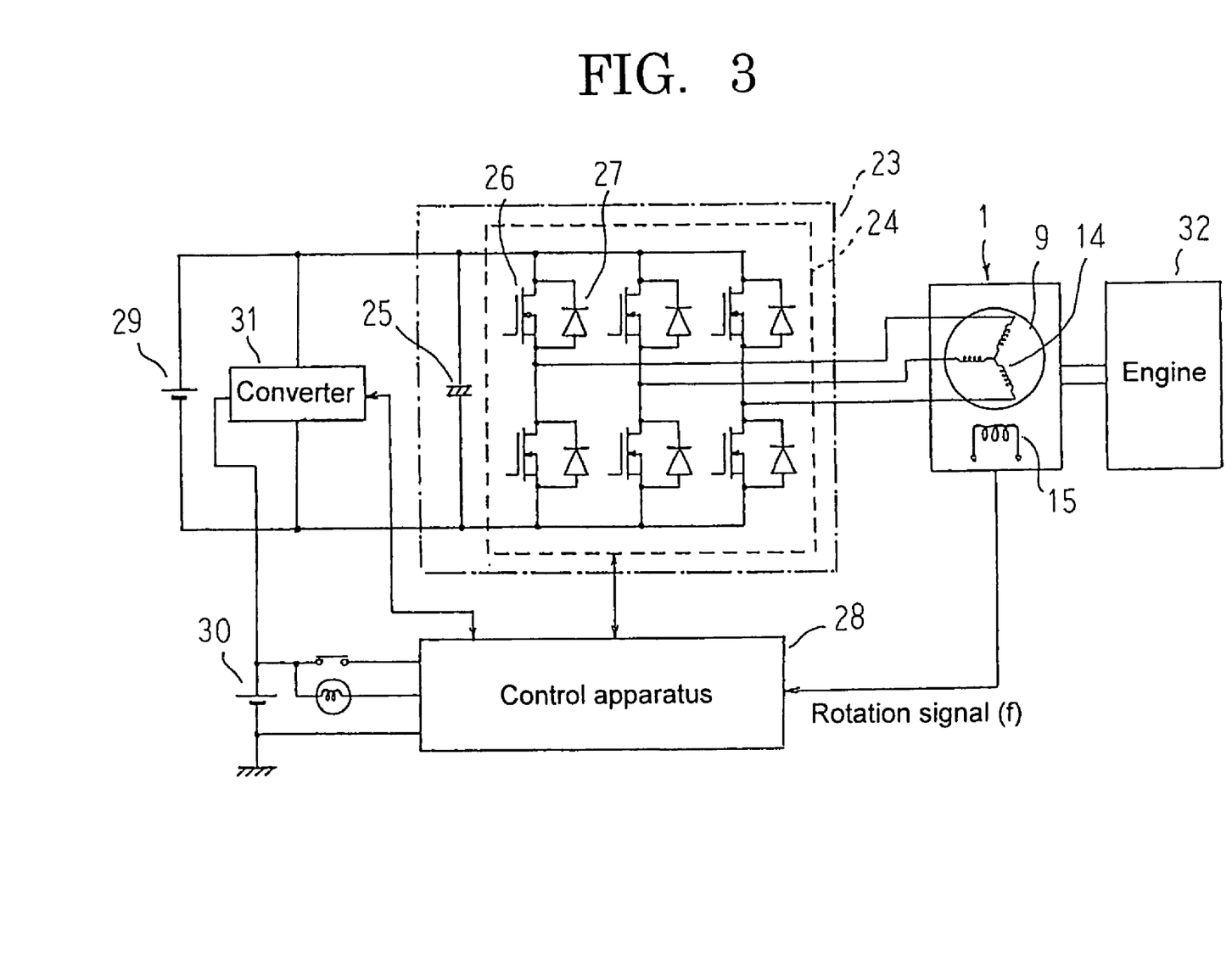
FIG. 3 is a conceptual diagram showing the automotive starter generator apparatus according to Embodiment 1 of the present invention.

FIG. 1 is a longitudinal section showing an automotive starter generator machine according to Embodiment 1 of the present invention, FIG. 2 is a perspective showing a rotor in the automotive starter generator machine according to Embodiment 1 of the present invention, and FIG. 3 is a conceptual diagram showing the automotive starter generator apparatus according to Embodiment 1 of the present invention.

In FIGS. 1 and 2, an automotive starter generator machine 1 functioning as an automotive dynamoelectric machine includes: a case 4 constituted by a front bracket 2 and a rear bracket 3 that are each generally cup-shaped and made of aluminum; a shaft 6 rotatably supported in the case 4 by means of first and second bearings 5a and 5b; a pulley 7 affixed to a first end of the shaft 6 projecting outward at a front end of the case 4; a rotor 8 affixed to the shaft 6 and rotatably disposed inside the case 4; an armature 9 held by an inner wall surface of the case 4 so as to surround the rotor 8; a pair of slip rings 10 fixed to a second end portion of the shaft 6; a brush holder 11 disposed on an outer periphery of the slip rings 10; and brushes 12 disposed inside the brush holder 11 so as to slide in contact with each of the slip rings 10.

The armature 9 includes: an armature core 13 disposed so as to be held between the front bracket 2 and the rear bracket 3 and surround the rotor 8; and an armature winding 14 installed in the armature core 13.

The rotor 8 includes: a field winding 15 for generating magnetic flux on passage of electric current; and a claw-pole (Lundell) rotor core 16 disposed so as to cover the field winding 15, magnetic poles being formed in the rotor core 16 by the magnetic flux from the field winding 15. The rotor core 16 is constituted by first and second pole cores 17 and 18 made of iron on which first and second claw-shaped magnetic poles 17a and 18a are disposed so as to project at a uniform angular pitch circumferentially on outer peripheral edge portions of first and second cylindrical boss portions 17b and 18b, respectively. Moreover, each of the first claw-shaped magnetic poles 17a is formed so as to extend radially outward from the outer peripheral edge portion at a first axial end of the boss portion 17b, and then extend toward a second axial end. Each of the second claw-shaped magnetic poles 18a is formed so as to extend radially outward from the outer peripheral edge portion at the second axial end of the boss portion 18b, and then extend toward the first axial end. The pole cores 17 and 18 are integrated with each other by abutting a second axial end surface of the first boss portion 17b and a first axial end surface of the second boss portion 18b such that the first and second claw-shaped magnetic poles 17a and 18a intermesh and pressing the shaft 6 into the boss portions 17b and 18b at a position of a central axis. Fans 19 are also affixed to the first and second axial ends of the rotor 8. In addition, permanent magnets 20 are disposed between circumferentially-adjacent claw-shaped magnetic poles 17a and 18a. Each of the permanent magnets 20 is made of a ferrite magnet, for example, and is magnetized so as to have a polarity equal to the polarity of the contacting claw-shaped magnetic poles 17a and 18a, in other words, such that a side contacting a North-seeking (N) pole is a North-seeking (N) pole, and a side contacting a South-seeking (S) pole is a South-seeking (S) pole.

The field winding 15 is wound onto a bobbin 21, and is mounted inside a space surrounded by the claw-shaped magnetic poles 17a and 18a, the permanent magnets 20, and the boss portions 17b and 18b.

A resolver 22 is disposed axially outside the second bearings 5b. The resolver 22 detects a relative position of the rotor 8 relative to the armature 9, in other words, the rotational speed of the rotor 8. A detection signal from the resolver 22 is output as a rotation signal (f) to a control apparatus 28 that is described below.

Next, a configuration of an automotive starter generator apparatus using the automotive starter generator machine 1 configured in this manner will be explained with reference to FIG. 3.

The rotor 8 of the automotive starter generator machine 1 is linked to a crank shaft of an engine 32 by a belt (not shown). In this case, the armature winding 14 is configured by wye-connecting three phase coils.

An inverter unit 23 is provided with: an inverter module 24 composed of a plurality of switching elements 26, and diodes 27 connected in parallel with each of the switching elements 26; and a capacitor 25 connected in parallel to the inverter module 24. The capacitor 25 serves a function of smoothing the electric current flowing through the inverter module 24.

The inverter module 24 is configured by forming sets each constituted by a switching element 26 and a diode 27 connected in parallel, connecting pairs of sets in series, disposing three such pairs in parallel, and sealing these switching elements 26 and diodes 27 integrally into a package. Each of the wye-connection end portions of the armature winding 14 are connected to respective intermediate points between the series-connected switching elements 26.

The switching operation of the switching elements 25 in the inverter module 24 is controlled by the control apparatus 28. When electric power is supplied, the automotive starter generator machine 1 operates as an electric starter motor to start the engine 32. After the engine 32 has been started, the automotive starter generator machine 1 is driven to rotate by the engine 32 and operates as an alternator, generating a three-phase alternating-current voltage.

A 36-volt first battery 29 constituting a driving power supply for the automotive starter generator machine 1 is connected in parallel to the inverter module 24. The automotive starter generator machine 1 is operated at high voltage (36 V) by the first battery 29. Since the electrical machinery load mounted to an automotive vehicle is generally rated at 12 V, a 12-volt second battery 30 is also mounted. Thus, a direct-current-to-direct-current (DC-to-DC) converter 31 is connected in parallel to the inverter module 24 to enable the electrical load-driving second battery 30 to be charged.

In other words, during starting of the engine 32 by the automotive starter generator machine 1, it is necessary to increase the generated torque of the automotive starter generator machine 1, that is, to increase the amount of excitation current flowing to the armature winding 14. During operation of the second battery 30 for driving the electric load mounted to the vehicle, loss is increased in the wiring, and in addition, the wiring itself must be enlarged in order to reduce wiring resistance. Thus, the voltage of the battery voltage is increased to reduce transmission loss.

Next, operation of an automotive starter generator apparatus configured in this manner will be explained.

First, the control apparatus 28 controls switching on and off of each of the switching elements 26 to generate three-phase alternating-current electric power from the direct-current electric power from the first battery 29. This three-phase alternating-current electric power is supplied to the armature winding 14, imparting a rotating magnetic field to the field winding 15 of the rotor 8 and driving the rotor 8 to rotate. Then, torque from the rotor 8 is transferred to the engine 32 by means of the pulley 7 and the belt (not shown), driving the engine 32 to rotate, that is, starting the engine 32.

Once the engine 32 has been started, torque from the engine 32 is transferred to the automotive starter generator machine 1 by means of the belt and the pulley 7. The rotor 8 is thereby driven to rotate, inducing a three-phase alternating-current voltage in the armature winding 14. Then, the control apparatus 28 switches off each of the switching elements 26 to make the automotive starter generator machine 1 generate electricity in the alternator generating mode. In this generating state, the inverter module 24 becomes a three-phase full-wave rectifier circuit in which sets of two diodes 27 are connected in parallel and three such sets are connected in parallel, and the three-phase alternating-current voltage induced in the armature winding 14 is rectified into direct current by the inverter unit 23. The first battery 29 is charged by the direct-current electric power rectified by the inverter unit 23. The direct-current electric power rectified by the inverter unit 23 is also converted to 12 V by the DC-to-DC converter 31 and supplied to the second battery 30.

Figure 4:
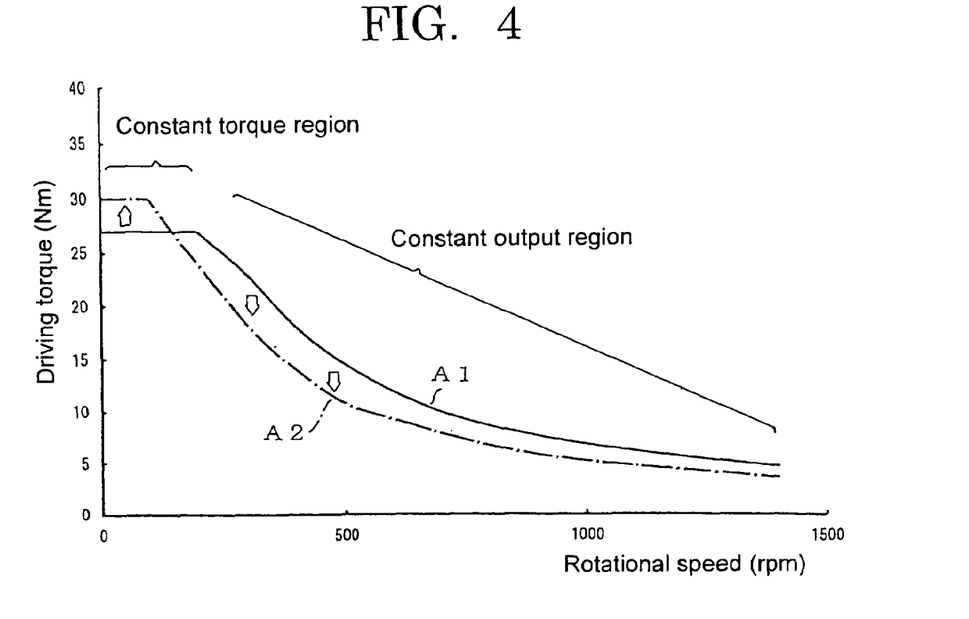
FIG. 4 is a graph showing drive characteristics during starting operation in automotive starter generator machines functioning as comparative examples.
Figure 5:
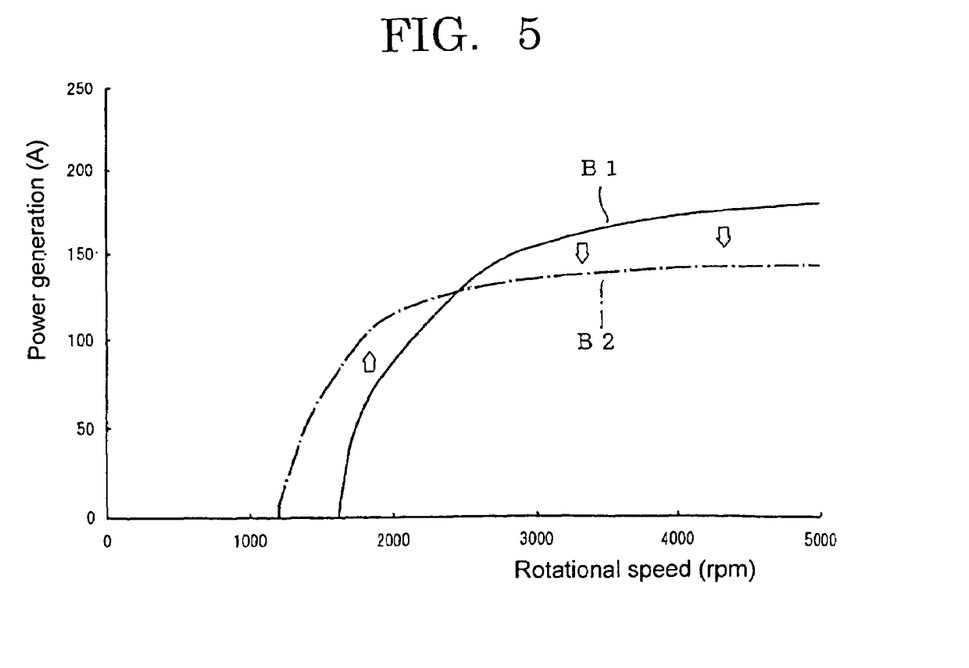
FIG. 5 is a graph showing generating characteristics during generating operation in automotive starter generator machines functioning as comparative examples.

Next, changes in characteristics in automotive starter generator machines due to changing the number of turns in armature windings will be explained with reference to FIGS. 4 and 5. FIG. 4 is a graph showing drive characteristics during starting operation in automotive starter generator machines functioning as comparative examples, curve A1 in the graph being the drive characteristics when the number of turns in the armature winding is four turns, and curve A2 being the drive characteristics when the number of turns in the armature winding is five turns. FIG. 5 is a graph showing generating characteristics during generating operation in automotive starter generator machines functioning as comparative examples, curve B1 in the graph being the generating characteristics in the alternator generating mode when the number of turns in the armature winding is four turns, and curve B2 being the generating characteristics in the alternator generating mode when the number of turns in the armature winding is five turns. Here, the automotive starter generator machines functioning as comparative examples are configured in a similar manner to the automotive starter generator machine 1 described above except for the fact that permanent magnets 20 are not disposed. The horizontal axis in each of the graphs represents the rotational speed of the automotive starter generator machine (the shaft 6).

In FIG. 4, as indicated by curves A1 and A2, a horizontal region extending from a rotational speed of 0 rpm is a constant torque region determined by the controlled current capacity of the inverter, and a torque proportional to the number of turns in the armature winding is generated if the inverter maximum current capacity is identical. Then, as the rotational speed increases, the torque decreases together with the increase in rotational speed since the terminal voltage of the automotive starter generator machine cannot exceed the voltage that is input (constant output region).

From FIG. 4, it can be seen that when the number of turns in the armature winding is increased, the maximum torque increases, but the constant output region decreases. In other words, the driving torque for identical rotational speeds is such that curve A1 is less than curve A2 in the constant torque region and curve A1 is greater than curve A2 in the constant output region. Moreover, the constant torque region becomes narrower if the number of turns in the armature winding is increased.

Thus, it can be seen that it is preferable for an achievable starting rotational speed to be high in starter motors, but sufficient function cannot be achieved merely by increasing the number of turns in the armature winding alone.

In FIG. 5, as indicated by curves B1 and B2, it can be seen that increasing the number of turns in the armature winding offsets a charging initiation rotational speed toward lower rotational speeds and increases power generation in a low rotational speed region. However, increasing the number of turns in the armature winding also increases reverse electromotive force for identical rotational speeds, and in addition, power generation in a high rotational speed region decreases since armature winding resistance increases.

Thus, in generators, sufficient function cannot be achieved merely by increasing the number of turns in the armature winding alone.

In other words, in field winding starter motor-generators functioning as comparative examples in which permanent magnets are not disposed, improvements in drive characteristics and improvements in generating characteristics conflict with each other, and a solution to this problem is required.

Figure 6:
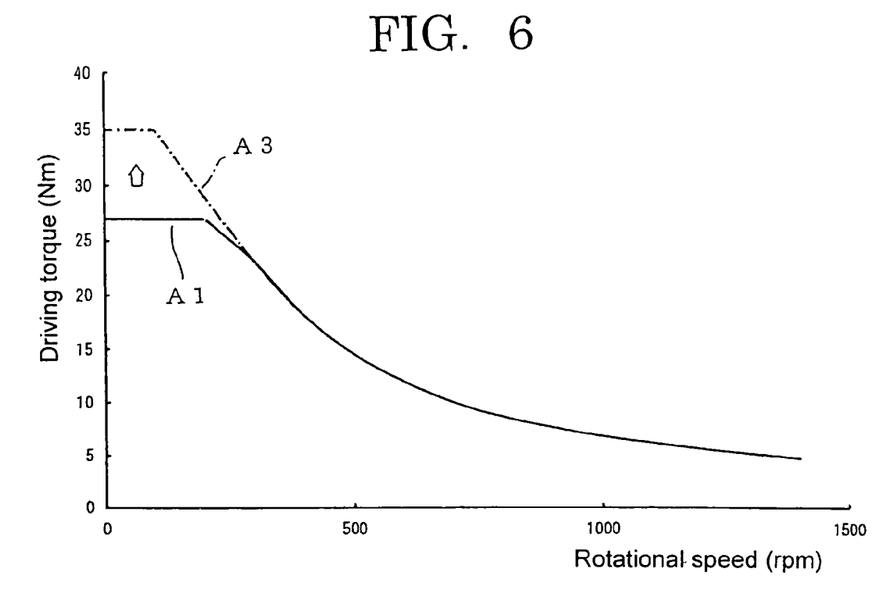
FIG. 6 is a graph showing drive characteristics during starting operation in the automotive starter generator machine according to Embodiment 1 of the present invention.
Figure 7:
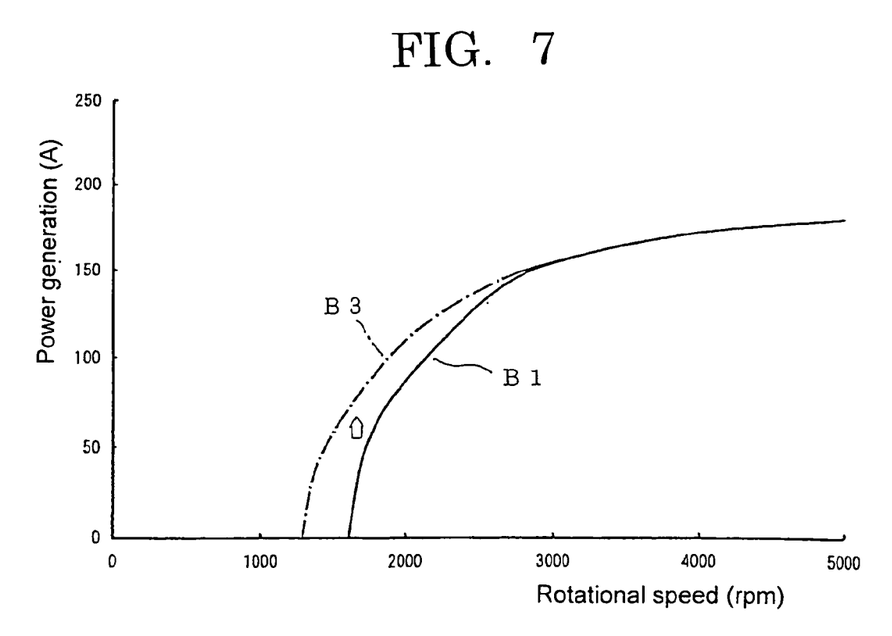
FIG. 7 is a graph showing generating characteristics during generating operation in the automotive starter generator machine according to Embodiment 1 of the present invention.

Next, changes in characteristics in automotive starter generator machines due to disposing permanent magnets 20 will be explained with reference to FIGS. 6 and 7. FIG. 6 is a graph showing drive characteristics during starting operation in the automotive starter generator machine according to Embodiment 1 of the present invention, curve A1 in the graph being the drive characteristics of an automotive starter generator machine functioning as a comparative example, and curve A3 being the drive characteristics of the automotive starter generator machine 1. FIG. 7 is a graph showing generating characteristics during generating operation in the automotive starter generator machine according to Embodiment 1 of the present invention, curve B1 in the graph being the generating characteristics of the automotive starter generator machine functioning as the comparative example, and curve B3 being the generating characteristics of the automotive starter generator machine 1. Moreover, the number of turns in the armature winding in the automotive starter generator machine 1 is equal to the number of turns in the armature winding in the automotive starter generator machine functioning as a comparative example (four turns).

As can be seen from FIG. 6, in the automotive starter generator machine 1, in which the permanent magnets 20 are disposed between the claw-shaped magnetic poles 17a and 18a, the maximum torque in the constant torque region is increased, and decreases in characteristics in the constant output region are suppressed compared to the automotive starter generator machine functioning as a comparative example (See curves A1 and A3). This improvement in maximum torque can be considered to be due to the magnetic flux of the permanent magnets 20 being added to the rotor 8. Furthermore, decreases in characteristics in the constant output region resulting from increasing the number of turns in the armature winding 14 are suppressed because the number of turns in the armature winding 14 is equal.

As can be seen from FIG. 7, in the automotive starter generator machine 1, the charging initiation rotational speed is offset toward lower rotational speeds and power generation in the low rotational speed region is increased. In addition, decreases in generating characteristics in the high rotational speed region are suppressed (see curves B1 and B3). This shift of the charging initiation rotational speed toward lower rotational speeds can be considered to be due to an increase in total magnetic flux due to the addition of the magnetic flux from the permanent magnets 20. Furthermore, because the number of turns in the armature winding 14 is equal, increases in reverse electromotive force and increases in resistance in the armature winding 14 at identical rotational speeds resulting from increasing the number of turns in the armature winding 14 are eliminated, suppressing decreases in characteristics in the high rotational speed region. In addition, since the magnetomotive force from the permanent magnets 20 is added to the magnetomotive force that is generated by the field winding 15, field magnetomotive force is increased, achieving increases in output at all operating rotational speeds.

Thus, according to Embodiment 1, because the permanent magnets 20 are disposed between the adjacent claw-shaped magnetic poles 17a and 18a, an automotive starter generator apparatus that enables improvements in starting characteristics and improvements in generating characteristics sought for starter generator apparatuses to be made compatible can be achieved.

Because the magnetic flux of the permanent magnets 20 is added to the rotor 8, maximum torque can be improved without increasing the body dimensions of the rotor 8, enabling increases in costs and deterioration in mountability to be suppressed.

Moreover, in Embodiment 1 above, ferrite magnets are used for the permanent magnets 20, but magnets of types having high residual magnetic flux such as neodymium-iron magnets, for example, may also be used for the permanent magnets. In that case, the line current for the armature winding 14 can be reduced, enabling reductions in inverter size, thereby enabling increases in cost to be kept to a minimum.

Embodiment 2

Figure 8:
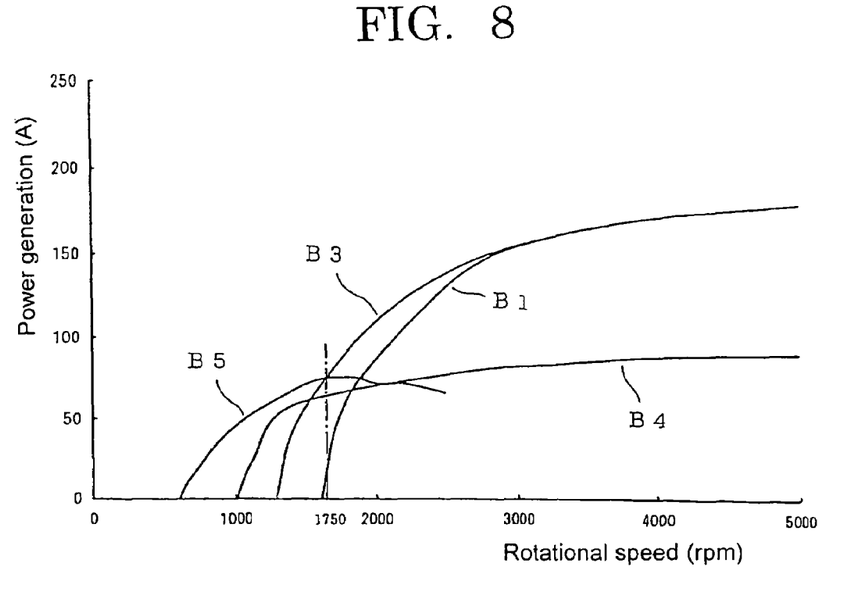
FIG. 8 is a graph showing generating characteristics during generating operation in an automotive starter generator machine according to Embodiment 2 of the present invention.

FIG. 8 is a graph showing generating characteristics during generating operation in an automotive starter generator machine according to Embodiment 2 of the present invention, curve B1 in the graph being generating characteristics in an alternator generating mode of an automotive starter generator machine functioning as a comparative example in which the number of turns in an armature winding is four turns and permanent magnets are not disposed, curve B3 being generating characteristics in the alternator generating mode of an automotive starter generator machine in which the number of turns in the armature winding is four turns and permanent magnets are disposed, curve B4 being generating characteristics in the alternator generating mode of an automotive starter generator machine functioning as a comparative example in which the number of turns in an armature winding is six turns and permanent magnets are not disposed, and curve B5 being generating characteristics in an inverter generating mode of an automotive starter generator machine functioning as a comparative example in which the number of turns in an armature winding is four turns and permanent magnets are not disposed.

Moreover, in the case of the inverter generating mode, the control apparatus 28 controls switching on and off of each of the switching elements 26 so as to convert a three-phase alternating-current voltage that is induced in the armature winding 14 into direct current.

In general automotive alternators, the number of turns in the armature winding 14 is set to approximately six turns in order to emphasize low-speed region power generation during power generation. That is, general automotive alternators exhibit generating characteristics equivalent to those of the automotive starter generator machine represented by curve B4.

If the number of turns in the armature winding 14 is changed from six turns to four turns, as indicated by curve B1, it can be seen that the charging initiation rotational speed is offset toward higher rotational speeds, but power generation in the high rotational speed region increases.

When permanent magnets 20 are disposed in an automotive starter generator machine in which the number of turns in the armature winding 14 is four turns, as indicated by curve B3, it can be seen that the charging initiation rotational speed is offset toward lower rotational speeds and power generation in the low rotational speed region is increased.

In addition, when power is generated in the inverter generating mode by an automotive starter generator machine in which the number of turns in the armature winding 14 is four turns, as indicated by curve B5, it can be seen that the charging initiation rotational speed is low and power generation in the low rotational speed region is increased compared to the automotive starter generator machine in which the number of turns in the armature winding 14 is six turns.

Consequently, by making automotive starter generator machines in which the number of turns in the armature winding 14 is four turns generate power in the inverter generating mode in the low rotational speed region and generate power in the alternator generating mode in the high rotational speed region, better generating characteristics can be achieved than for automotive starter generator machines in which the number of turns in the armature winding 14 is six turns, in other words, general automotive alternators.

In addition, even better generating characteristics can be achieved by disposing permanent magnets 20 as well as making automotive starter generator machines in which the number of turns in the armature winding 14 is four turns generate power in the inverter generating mode in the low rotational speed region and generate power in the alternator generating mode in the high rotational speed region. Here, since field magnetic flux is improved by disposing the permanent magnets 20, power generation in the inverter generating mode is greater than that of curve B5. However, since power generation in the inverter generating mode need only achieve power generation equivalent to that of curve B5, the line current passed to the armature winding 14 can be reduced, enabling reductions in inverter size and cost reductions.

Thus, an automotive starter generator apparatus enabling better generating characteristics to be obtained over all rotational speed regions can be achieved by making the control apparatus 28 control switching on and off of each of the switching elements 26 based on output from the resolver 22 so as to generate power in an inverter generating mode in a low rotational speed region and switch each of the switching elements 16 off so as to generate power in an alternator generating mode in a high rotational speed region in an automotive starter generator machine in which permanent magnets 20 are disposed between the claw-shaped magnetic poles 17a and 18a. Because the permanent magnets 20 are disposed, the number of turns in the armature winding 14 can be reduced, enabling reductions in size, and the line current passed to the armature winding 14 can be decreased, enabling reductions in inverter size and cost reductions.

In addition, because the automotive starter generator machine can be produced based on general automotive alternators, the automotive starter generator machine can be produced at low cost.

Moreover, in FIG. 8, the point of intersection between curve B3 and curve B5 is at approximately 1,750 rpm. Since the torque transmission pulley ratio in an automotive dynamoelectric machine is around 2.5, a rotational speed of 1,750 rpm in the shaft 6 corresponds to 700 rpm when calculated as rotational speed in the engine 32. A normal service rotational speed region in an engine is 700 to 3,000 rpm. Thus, after starting the engine 32, the control apparatus 28 may, for example, perform control such that power is generated in the inverter generating mode until the normal service rotational speed region is reached (the low rotational speed region) and power is generated in the alternator generating mode after the normal service rotational speed region is reached (the high rotational speed region).

Embodiment 3

Figure 9:
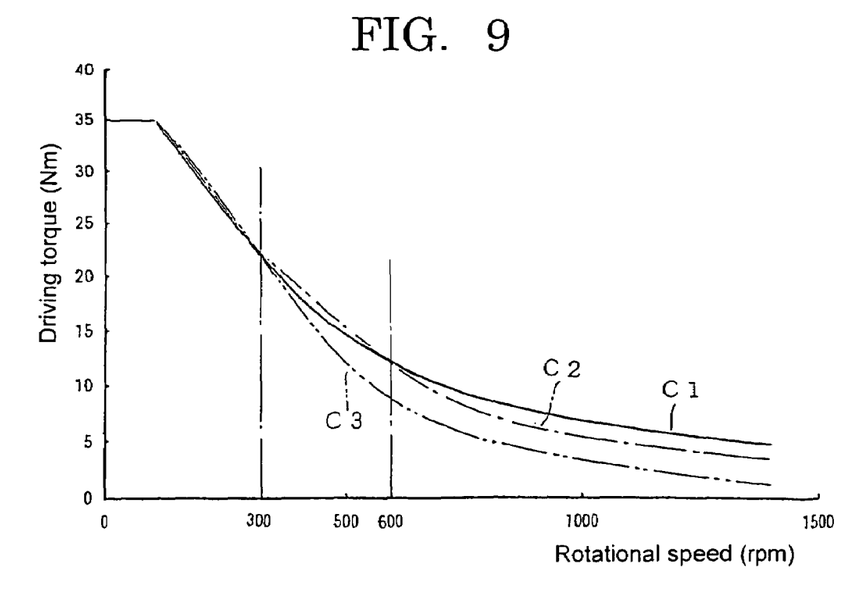
FIG. 9 is a graph showing a relationship between field current and drive characteristics in an automotive starter generator machine according to Embodiment 3 of the present invention.

FIG. 9 is a graph showing a relationship between field current and drive characteristics in an automotive starter generator machine according to Embodiment 3 of the present invention. Moreover, in the graph, the field currents passing through a field winding 15 are such that curve C1 field current<curve C2 field current<curve C3 field current.

From FIG. 9, it can be seen that output torque is such that curve C1<curve C2<curve C3 when a rotational speed is less than 300 rpm, curve C3<curve C1<curve C2 when the rotational speed is greater than or equal to 300 rpm and less than 600 rpm, and curve C3<curve C2<curve C1 when the rotational speed is greater than or equal to 600 rpm.

Consequently, output in a constant output region can be improved by making a control apparatus 28 monitor the rotational speed of an automotive starter generator machine 1 based on output from a resolver 22, and controlling the field current so as to follow curve C3 when the rotational speed is less than 300 rpm, controlling the field current so as to follow curve C2 when the rotational speed is greater than or equal to 300 rpm and less than 600 rpm, and controlling the field current so as to follow curve C1 when the rotational speed is greater than or equal to 600 rpm.

In automotive starter generator machines to which permanent magnets 20 have been added, when a field current equivalent to that of automotive starter generator machines in which permanent magnets 20 are not disposed is passed to the field winding 15, output in the constant output region decreases due to reverse electromotive forces accompanying the addition of the permanent magnets 20.

However, by controlling the field current passed to the field winding 15 in this manner so as to be reduced in response to the rotational speed of the automotive starter generator machine 1, that is, as the rotational speed increases, problems such as output in the constant output region decreasing as a result of the reverse electromotive forces accompanying addition of the permanent magnets 20 can be solved.

Embodiment 4

Figure 10:
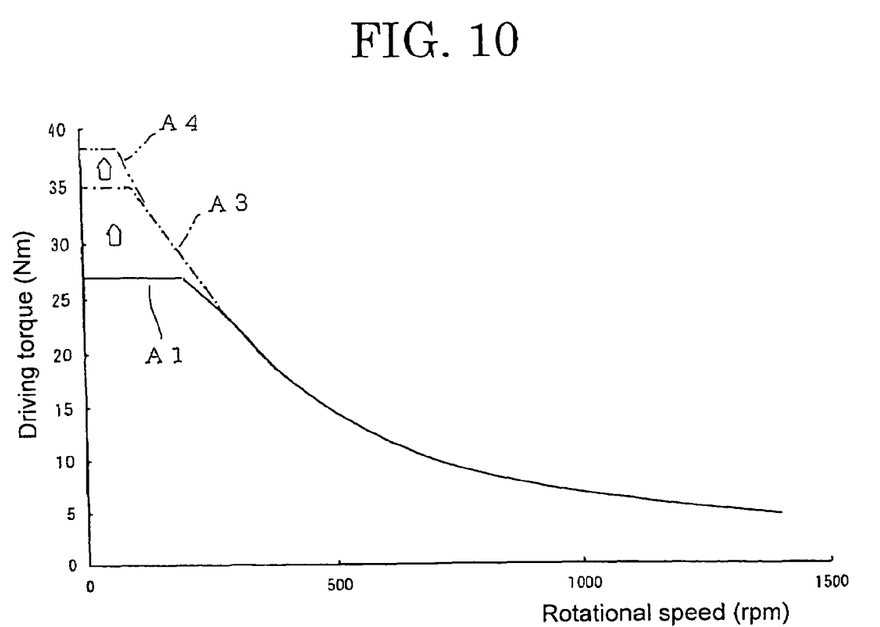
FIG. 10 is a graph showing drive characteristics during starting operation in an automotive starter generator machine according to Embodiment 4 of the present invention.

FIG. 10 is a graph showing drive characteristics during starting operation in an automotive starter generator machine according to Embodiment 4 of the present invention, curve A1 in the graph being the drive characteristics of an automotive starter generator machine functioning as a comparative example, curve A3 being the drive characteristics of the automotive starter generator machine 1, and curve A4 being the drive characteristics of an automotive starter generator machine 1 when the field current passed to the field winding 15 is increased.

From FIG. 10, it can be seen that maximum torque in the constant torque region is increased in an automotive starter generator machine 1 in which permanent magnets 20 are disposed between claw-shaped magnetic poles 17a and 18a compared to an automotive starter generator machine functioning a comparative example (see curves A1 and A3). In addition, the maximum torque in the constant torque region can be further increased by increasing the field current passed to the field winding 15 (see curves A3 and A4).

Here, thermal design of the field winding 15 is performed with consideration for operational states of the automotive starter generator machines 1. Since the operating time of a starting operation is a significantly shorter period of time than that of a generating operation, which is operated continuously, maximum field current passed to the field winding 15 during starting operation can be set greater than maximum field current passed to the field winding 15 during generating operation.

In Embodiment 4, attention is focused on the rated differences between the field current during generating operation and the field current during starting operation described above, and a control apparatus 28 controls the field current passed to the field winding 15 during starting operation so as to be greater than the field current passed to the field winding 15 during generating operation. The field magnetomotive force during starting operation can be increased, enabling a large maximum torque to be obtained. Because the field current passed to the field winding 15 during generating operation is set with consideration for the thermal design of the field winding 15, excessive temperature increases in the field winding 15 are suppressed.

Thus, in Embodiment 4, because the field current during starting operation is made greater than the field current during generating operation, excessive temperature increases in the field winding 15 are suppressed, enabling an automotive starter generator apparatus to be achieved in which drive characteristics are improved.

Embodiment 5

Figure 11:
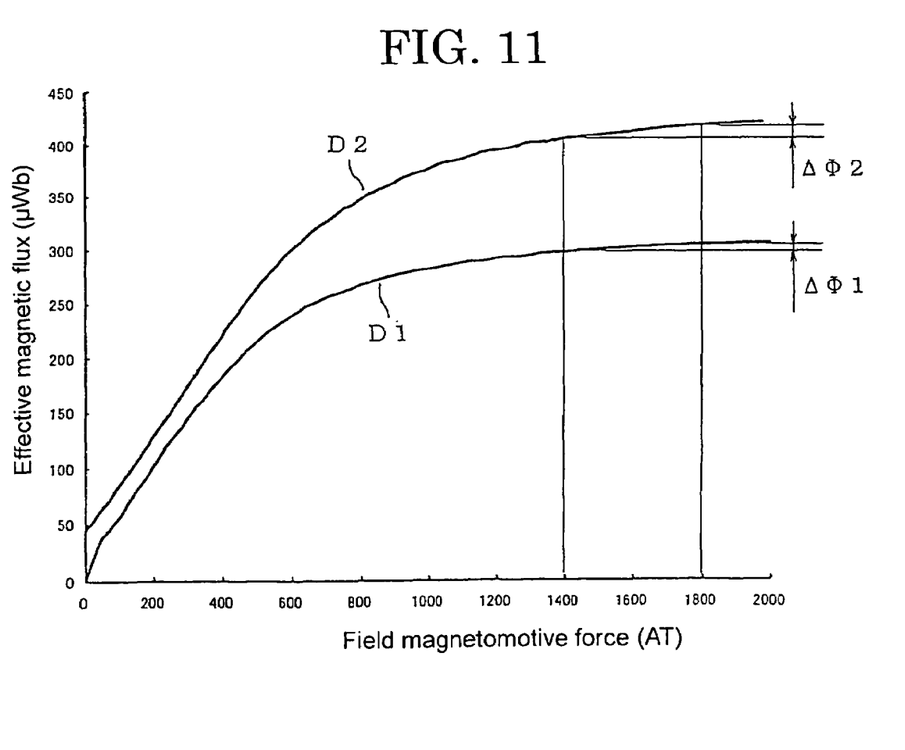
FIG. 11 is a graph showing a relationship between field magnetomotive force and effective magnetic flux in an automotive starter generator machine according to Embodiment 5 of the present invention.

FIG. 11 is a graph showing a relationship between field magnetomotive force and effective magnetic flux in an automotive starter generator machine according to Embodiment 5 of the present invention, curve D1 in the graph being the characteristics of an automotive starter generator machine functioning as a comparative example, and curve D2 being the characteristics of an automotive starter generator machine 1. Specifically, curve D1 represents a relationship between field magnetomotive force and effective magnetic flux in an automotive starter generator machine from which permanent magnets are omitted, and curve D2 represents a relationship between field magnetomotive force and effective magnetic flux in an automotive starter generator machine in which permanent magnets are disposed. Moreover, the horizontal axis of the graph is the field magnetomotive force, 1,400 AT (ampere turns) corresponds to the resulting field magnetomotive force when a field current is passed to the field winding 15 at a field current control duty of 80 percent, and 1,800 AT corresponds to the resulting field magnetomotive force when a field current is passed to the field winding 15 at a field current control duty of 100 percent. The vertical axis is the effective magnetic flux per turn per pole in the armature 9.

Generally, automotive dynamoelectric machines are operated with field magnetomotive force in magnetic circuits at saturated levels. When magnetic circuits are saturated, effective magnetic flux may not increase further even if the field magnetomotive force due the field current is increased. In field winding automotive dynamoelectric machines in particular, in states in which portions of the rotor core 16 become magnetically saturated, these operating states can be said to be inefficient because effective magnetic flux does not change even though loss due to field current increases. In other words, as indicated by curve D1 in FIG. 11, if the field current is applied at a control duty of 100 percent, improvement in characteristics in the vicinity of 100 percent, that is, effective magnetic flux increase $\Delta\Phi1$, is small compared to when controlled at a duty of 80 percent, for example. Thus, conventionally, in order to suppress loss as much as possible, maximum field magnetomotive force during starting operation has been controlled so as to be in a vicinity of a field current control duty of 80 percent.

On the other hand, in an automotive starter generator machine in which permanent magnets 20 are disposed between the claw-shaped magnetic poles 17a and 18a, as indicated by curve D2 in FIG. 11, it can be seen that if the field current is applied at a control duty of 100 percent, effective magnetic flux increase $\Delta\Phi2$ is large compared to when the field current is controlled at a duty of 80 percent, for example, making changes in characteristics large. This can be considered to result from magnetic saturation in portions of the rotor core 16 being alleviated by disposing the permanent magnets 20 between the claw-shaped magnetic poles 17a and 18a.

In Embodiment 5, in a similar manner to Embodiment 4 above, attention is focused on rated differences in field current, and field magnetomotive force is operated at a field current control duty of 100 percent during a starting operation constituting a short-time rating by setting field magnetomotive force during starting operation so as to be greater than the field magnetomotive force during generating operation constituting a continuous rating, and by disposing permanent magnets 20. The maximum driving torque during starting operation is thereby improved.

Moreover, in each of the above embodiments, a claw-pole rotor core 16 in which adjacent claw-shaped magnetic poles 17a and 18a are separated completely circumferentially is explained as being used, but the present invention also has similar effects if used in a rotor core in which adjacent claw-shaped magnetic poles are linked at outer peripheral portions by a linking structure constituted by a thin magnetic body. Specifically, a rotor core in which adjacent claw-shaped magnetic poles are linked at outer peripheral portions by a linking structure constituted by a thin magnetic body functions as a claw-pole rotor core according to the present invention because the thin linking structure is magnetically saturated, magnetically separating the adjacent claw-shaped magnetic poles from each other. Furthermore, an outer peripheral surface of a rotor core in which adjacent claw-shaped magnetic poles are linked at outer peripheral portions by a linking structure constituted by a thin magnetic body constitutes a smooth cylindrical surface because the outer peripheral portions of the claw-shaped magnetic poles are linked by the linking structure, reducing wind noise resulting from irregularities on the outer peripheral surface of the rotor core.

What is claimed is:

1. An automotive starter generator apparatus comprising:
   a battery;
   an automotive dynamoelectric machine linked to an engine, said automotive dynamoelectric machine being driven by electric power from said battery during starting of said engine so as to start said engine, and being driven by said engine after said engine has been started so as to generate alternating-current power;
   an inverter having a plurality of sets constituted by:
      a pair of switching elements connected in series between positive and negative terminals of said battery; and
      a diode connected in parallel with said switching elements,
      a connection point between said switching elements connected in series being connected to said automotive dynamoelectric machine; and
   a control apparatus for controlling said inverter such that said switching elements are switched ON and OFF during starting of said engine to supply electric power from said battery to said automotive dynamoelectric machine to drive said automotive dynamoelectric machine, and said switching elements are controlled after said engine has been started such that said diodes rectify alternating-current power generated by said automotive dynamoelectric machine and charge said battery, wherein:

said automotive dynamoelectric machine comprises:
- an armature core onto which an armature winding is wound; and
- a rotor having:
    - a claw-pole rotor core disposed on an inner peripheral side of said armature core; and
    - a field winding installed on an inner peripheral side of claw-shaped magnetic poles of said claw-pole rotor core; and
- a permanent magnet is disposed between an adjacent pair of said claw-shaped magnetic poles;

wherein said control apparatus controls said inverter such that said switching elements are switched ON and OFF after said engine has been started to generate power in an inverter generating mode until a normal service rotational speed region is reached, and said switching elements are switched OFF after said normal service rotational speed region has been reached to generate power in an alternator generating mode.

2. The automotive starter generator apparatus according to claim 1, wherein:

said control apparatus controls a field current passed to said field winding so as to be reduced as rotational speed increases during starting operation.

3. The automotive starter generator apparatus according to claim 1, wherein:

said control apparatus controls a field current passed to said field winding such that a field magnetomotive force during starting operation is greater than a maximum field magnetomotive force during generating operation.

4. The automotive starter generator apparatus according to claim 1, wherein:

said control apparatus controls a field current so as to be passed to said field winding at a field current control duty of 100 percent during starting operation.

* * * * *